US008464210B1

(12) United States Patent
Tarle et al.

(10) Patent No.: US 8,464,210 B1
(45) Date of Patent: Jun. 11, 2013

(54) SOFTWARE DEVELOPMENT AND TESTING ENVIRONMENT

(75) Inventors: Peter George Tarle, Belleville (CA); Troy Mark Gonsalves, Waterloo (CA); Maneesha Sahasrabudhe, Los Angeles, CA (US); Grant Weddell, Waterloo (CA)

(73) Assignee: Rockstar Consortium US LP, Plano, TX (US)

( * ) Notice: Subject to any disclaimer, the term of this patent is extended or adjusted under 35 U.S.C. 154(b) by 1912 days.

(21) Appl. No.: 11/316,268

(22) Filed: Dec. 22, 2005

(51) Int. Cl.
*G06F 9/44* (2006.01)
*G06F 9/45* (2006.01)

(52) U.S. Cl.
USPC ............ 717/106; 717/104; 717/108; 717/136

(58) Field of Classification Search
USPC ............... 707/22, 102, 203; 717/104, 106, 717/108, 136
See application file for complete search history.

(56) References Cited

U.S. PATENT DOCUMENTS

| | | | | |
|---|---|---|---|---|
| 5,553,234 | A * | 9/1996 | Cotner et al. ................. | 714/16 |
| 6,233,573 | B1 * | 5/2001 | Bair et al. ..................... | 707/3 |
| 6,477,540 | B1 * | 11/2002 | Singh et al. ................... | 1/1 |
| 6,601,234 | B1 * | 7/2003 | Bowman-Amuah .......... | 717/108 |
| 2003/0167274 | A1 * | 9/2003 | Dettinger et al. ............. | 707/100 |
| 2004/0233232 | A1 * | 11/2004 | Iborra et al. .................. | 345/700 |
| 2006/0005067 | A1 * | 1/2006 | Llyod ............................ | 714/4 |
| 2007/0038651 | A1 * | 2/2007 | Bernstein et al. ............. | 707/100 |

OTHER PUBLICATIONS

Marcos et al., "Extending UML for Object-Relational Database Design," Jan. 1, 2001, Springer Berlin/Heidelberg, vol. 2185/2001, pp. 225-239.*
Alves-Foss et al., "Experiments in the Use of XML to Enhance Traceability Between Object-Oriented Design Specifications and Source Code," Jan. 2002, IEEE, Proceedings of the 35th Annual Hawaii International Conference, pp. 3959-3966.*
Shanmugasundaram et al. A General Technique for Querying XML Documents using a Relational Database System. [online] (Sep. 2001). ACM, pp. 20-26. Retrieved From the Internet <http://delivery.acm.org/10.1145/610000/603871/p20-shanmugasundaram.pdf?ip=151.207.242.4&acc=ACTIVE%20SERVICE &CFID=96151487&CFTOKEN=82991457&___acm___=1.*
Alves et al. Strategic term rewriting and its application to a VDM-SL to SQL conversion. [online] (Jul. 22, 2005). Springer, pp. 1-16. Retrieved From the Internet <http://www.springerlink.com/content/0qnp6xfw4h0jc8hx/>.*

* cited by examiner

*Primary Examiner* — Emerson Puente
*Assistant Examiner* — Jonathan R Labud
(74) *Attorney, Agent, or Firm* — Christopher & Weisberg, P.A.

(57) ABSTRACT

The invention is directed to method of generating database encoded software for controlling operation of a data processing device. The method comprises providing a formal language specification representative of source code for the software, translating said formal language specification into data suitable for storing in database structures and in a form suitable for being queried by a database query language and storing said data in database structures of a database. The method includes using a software development tool in a software development and testing environment to manipulate the database encoded software using a database query language such as SQL and XQuery to develop new software features. The query language can also be used to control replication and/or synchronization of the database encoded software with the contents of a data processing device control program database by way of installing said control program on said device or upgrading the control program software of said device.

25 Claims, 3 Drawing Sheets

SOFTWARE DEVELOPMENT AND TESTING ENVIRONMENT

FIELD OF THE INVENTION

The present invention relates to a software development and testing environment, and particularly, but not exclusively, to an environment for developing and testing telecommunication features software. The present invention also relates to a method and system for providing a complete set of features software, features software additions, upgrades and/or enhancements to a data processing device such as a telephone, for example.

BACKGROUND TO THE INVENTION

In a software system, a feature is an increment of functionality, usually with a coherent purpose. A feature is normally described from a user's perspective and may be described in a natural language format, but is more normally presented in the form of a formal language specification that is representative of software code often written in a source language such as C, C++, C# or Java. The code, when executed in a processor of a data processing device, implements said feature.

Typical software design methodologies using source languages such as C. C++ or Java suffer from a number of problems that cause high labor costs, poor quality and unpredictable completion scheduling of complex software projects. These problems include incomplete capture of feature requirements using prose-based descriptions of feature operations that do not cover every possible scenario and event. Also, feature interactions for complex systems grow at an exponential rate that makes complete feature definition impracticable using traditional feature definition specification documentation. However, without a complete feature specification, the eventual operation of the software is left open to subjective interpretations of the designer(s) and may not be formally captured outside of the implied operation of the code itself. A further problem is that the addition of new features using source code changes creates a risk that existing features may no longer work as previously. The manual methods of defect avoidance such as code inspection and regression testing reduce this risk but do not eliminate the possibility of new defects in old features.

In the field of telecommunications, features software became possible in the 1960s, with the advent of computer-controlled telephone switches. Telecommunication software has been conceived in terms of features ever since. Features may be optional, so that different users of data processing devices such as telephones can subscribe to the features they require or desire. Many features can be enabled or disabled dynamically by their subscribers. The provision of new or enhanced features is an important differentiator between telecommunication service providers and an important source of revenue over and above revenues generated by basic call services.

Utilizing features software is popular because it makes it easy to add and change features. However, an ever demanding problem exists in the form of unwanted features interactions and how to test for these and resolve them. It should be noted that not all features interactions are undesirable, but the emphasis is naturally on dealing with unwanted interactions since these can have unexpected consequences that may threaten the integrity of a vendor's product.

Consider, for example, a Private Branch Exchange "PBX". The feature set of a known PBX can amount to over 500 features, with more than 3 million lines of code implementing those features. The possible number of features interactions can be proportional to the product of 2 to the power of 500 ($2^{500}$) so it is impractical to test for every possible features interaction because the time and expense of doing so using existing tools would be uneconomical, if not impossible. In most commercial situations, testing for and resolving features interactions is a compromise between on the one hand providing acceptable quality software and on the other hand time to market, cost of development and testing, etc.

A feature interaction is a special case that arises when two different features have a response to the same event or sequence of events. When such an event occurs the features should behave in one of three ways:

1) Overridden Response: The behavior of one feature overrides the behavior of the other. That is, one feature handles the event and the other feature acts as if it were disabled;

2) Concurrent Response: both features react to the event. That is, they act as if the other feature did not exist; and 3) Combined Response: the two features react in a combined fashion. That is, they have been arranged to react in a special way that is not merely a combination of their reactions when separately implemented.

If the features do not behave in one of these ways then one of the following bugs has occurred:

1) The incorrect feature or combination of features has responded to the event. For example, an option setting has been ignored/overlooked or a new feature or option is required;

2) The correct response occurred but the responding feature or combination of features was implemented incorrectly; and 3) A conflict arises—this can only occur in the case of a Concurrent Response. The two features have conflicting use for the same resource. That is, one feature uses some resource in a way that prevents the other feature from behaving as expected. One example would be acquiring access to a shared resource and not releasing it. A more specific example would be when one feature wants to turn on a light continuously on the device display while the other wants to have the light blink.

An example of a feature interaction in a PBX may comprise the interaction between say "Call Answer"—when a user does not answer an incoming call the caller is redirected to an answering service, where they can record a voice message for the user—and "Call Forward"—which allows a user to redirect (Forward) calls made to a particular phone number to another number. For example, the user could forward calls from his/her work extension to his/her mobile handset when away from the office. Clearly, these features are incompatible. Therefore, it is necessary to determine whether "Call Forwarding" should override "Call Answer" and then resolve the resultant determination. This feature interaction is simple to resolve since if "Call Forwarding" does not override "Call Answer" then it serves no useful purpose. Thus, the code for one or both of "Call forwarding" and "Call Answer" requires modification to ensure "Call forwarding", when enabled, overrides "Call Answer". However, dealing with a features interaction is not always as simple as selecting one feature over the other. Sometimes new functionality needs to be introduced to accommodate the desired behavior.

A features interaction therefore is some way in which a feature or features modify or influence another feature in defining overall system behavior. Features interactions are especially common in telecommunications, because all features are modifying or enhancing the same basic service, i.e. the plain old telephone service (POTS). However, the features interaction problem is not limited to circuit switched legacy networks. New packet based telecommunications networks which are feature rich have a complexity that far outstrips that ever implemented in circuit switched systems and so the features interaction problem is a continuing and ever expanding one.

Historically, developers of telecommunication software have had no effective means of understanding and managing all features interactions. As a result, features interactions have been a notorious source of runaway complexity, software bugs, cost and schedule overruns, and unfortunate user experiences. Further, the problem of features interactions is no longer only a concern in the development of features software in the field of telecommunications but also now for developers of software systems in other fields.

OBJECT OF THE INVENTION

It is an object of the invention to mitigate and/or obviate issues associated with the problems encountered in the development and testing of features software.

It is another object of the invention to provide a software development environment that is more efficient in identifying and resolving features interactions in developed features software.

It is yet another object of the invention to provide a features definition database for storing a complete definition of all supported features for a data processing device.

It is yet another object of the invention to provide a software development environment for creating a device database for storing encoded logic for device operation of a data processing device.

It is yet another object of the invention to provide a system for providing features software additions, upgrades and/or enhancements to a data processing device such as a telephone, for example.

SUMMARY OF THE INVENTION

In a first aspect, the present invention provides a method of generating database encoded software for controlling operation of a data processing device, the method comprising the steps of: providing a formal language specification representative of source code for the software; translating said formal language specification into data suitable for storing in database structures and in a form suitable for being queried by a database query language; and storing said data in database structures of a database.

In a second aspect, the present invention provides a database for storing database encoded software for controlling operation of a data processing device, the database comprising a plurality of database structures, each database structure being encoded with data derived from a respective part of a formal language specification and in a form suitable for being queried by a database query language, said formal language specification being representative of source code for the software.

In a third aspect, the present invention provides a system for generating software for controlling operation of a data processing device, the system comprising: a features definition database for storing in database encoded form a formal language specification representative of source code for the software, said formal language specification being translated into a format suitable for storing in database structures and in a form suitable for being queried by a database query language; and a software development module coupled to said database for enabling a user to manipulate data stored in said database structures through the use of queries constructed in said database query language.

In a fourth aspect, the present invention provides a method of installing software for controlling operation of a data processing device, the method comprising: providing a features definition database for storing in database encoded form a formal language specification representative of source code for the software, said formal language specification being translated into a format suitable for storing in database structures and in a form suitable for being queried by a database query language; and replicating the contents of said features definition database with a control program database of the data processing device.

In a fifth aspect, the present invention provides a method of updating software for controlling operation of a data processing device, the method comprising: providing a database for storing in database encoded form a formal language specification representative of source code for the software, said formal language specification being translated into a format suitable for storing in database structures and in a form suitable for being queried by a database query language; and synchronizing the contents of said database with a database encoded control program stored in one or more databases of the data processing device.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying drawings.

The exemplary embodiment of the software development and testing system to be described herein will be described generally with reference to a telecommunications system. However, it will be understood that the present invention is equally applicable to non-telecommunication software development and testing.

Figure 1:
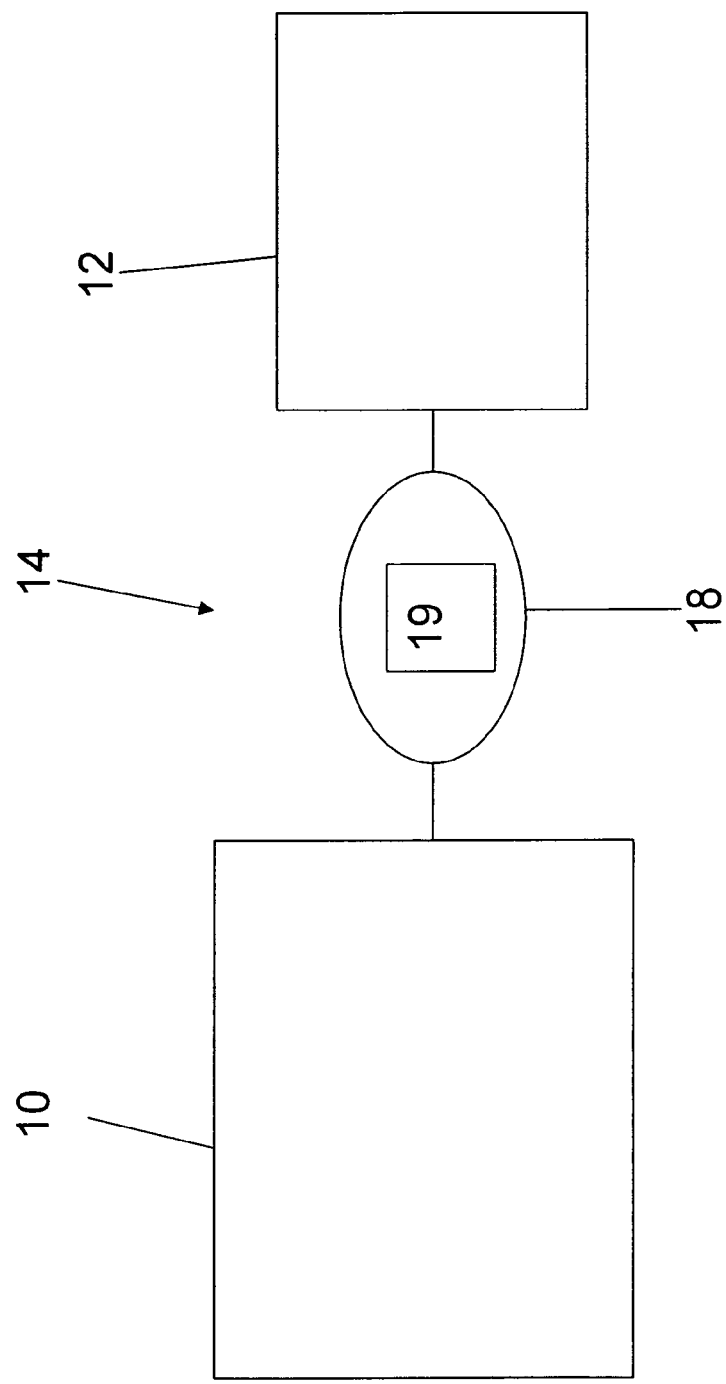
FIG. 1 is a schematic block diagram representative of a software development and testing environment in accordance with the present invention.

Referring to FIG. 1, there is shown a schematic block diagram representative of a software development and testing environment in accordance with the present invention. Also schematically represented by this figure is a system for providing feature software additions, upgrades and enhancements to a data processing device or system as will become more apparent from the following description. In FIG. 1, there is shown the software development and testing environment 10 coupled to a data processing device 12. The connection 14 between the software development and testing environment 10 and the data processing device 12 may comprise any known means of connecting a data processing device to a computing device or system. The connection 14 may comprise a direct physical connection such as a Universal Serial Bus "USB" connection or an indirect connection such as a Bluetooth wireless connection.

Also envisaged is a network connection (represented by the oval formation 18 in FIG. 1) such as a Local Area Network "LAN" connection and/or a Wide Area Network "WAN" connection. The network connection may be a private connection such as provided within an enterprise network, a public connection such as the Internet or a combination of such connections.

Figure 2:
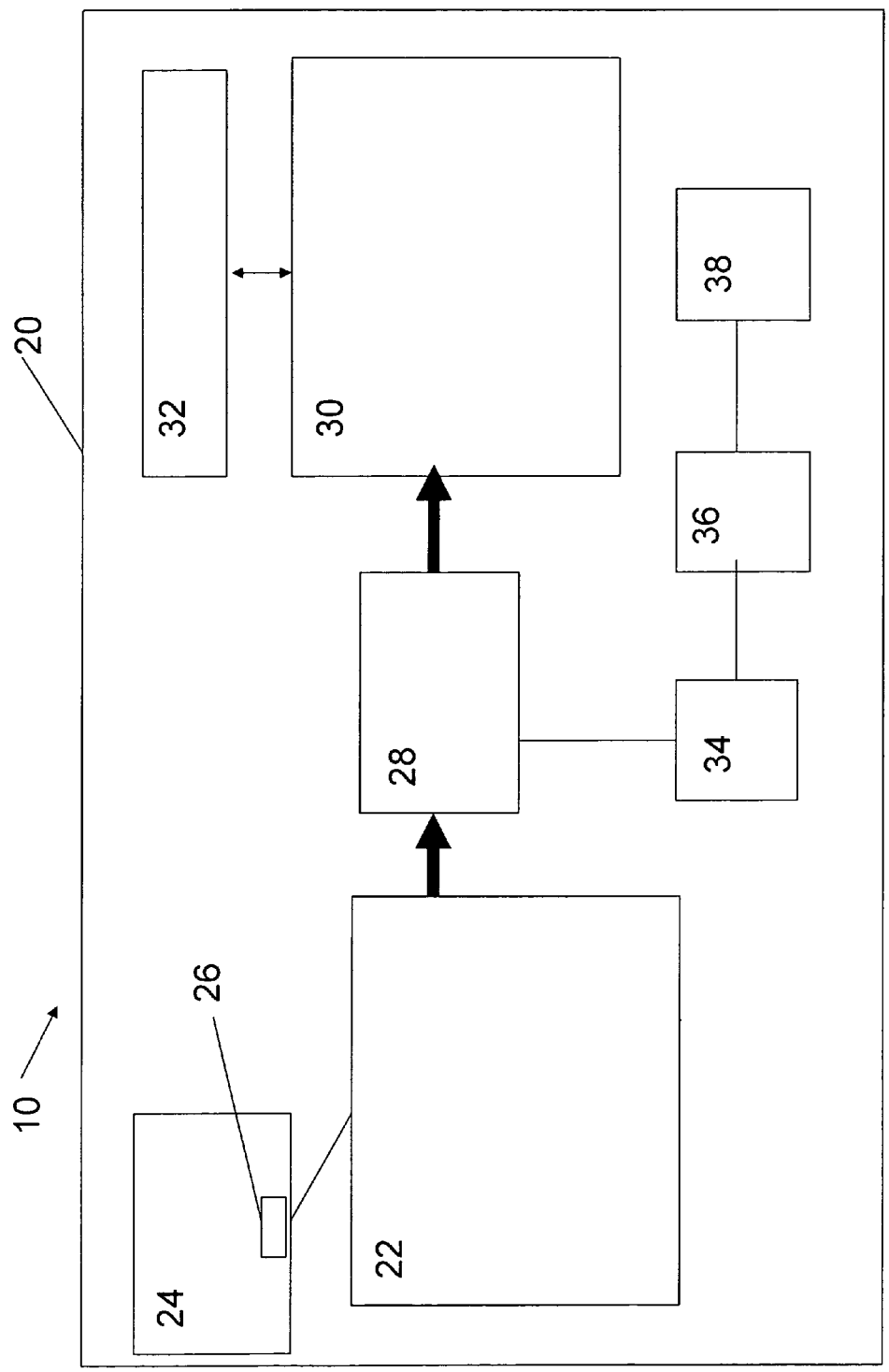
FIG. 2 is a schematic block diagram showing the software development and testing environment in accordance with the present invention in more detail.

Referring to FIG. 2, the software development and processing environment 10 comprises a computing platform 20 having a features definition database 22 and a features definition development and testing module 24 (hereinafter referred to as the development module). The features definition database 22 is arranged to store a complete set of definitions of all supported features for the data processing device in a manner that will be more fully explained below. The computing platform 20 may comprise an integrated computing device such as a mainframe computer using the UNIX operating system. The features definition database 22 may comprise any form of non-volatile memory, such as a flash memory, a hard drive or a Universal Serial Bus "USB" key, etc. A USB key is a non-volatile memory device powered through a USB connection to a computer. Alternatively, the computing platform 20 may comprise a distributed computing environment with the features definition database 22 and development module 24 being connected through a private network such as an enterprise network and/or a public network such as the Internet. The features definition database 22 could comprise a network type database such as a Sun Microsystems Network File System or a Structured Query Language "SQL" database such as an Open DataBase Connectivity "ODBC" enabled database. ODBC comprises a standard application programming interface (API) for accessing data in both relational and non-relational database management systems. Using this API, database applications can access data stored in database management systems on a variety of computers even if each database management system uses a different data storage format and programming interface.

The development module 24 is arranged to enable the features definitions stored in the features definition database 22 to be modified to create new features, to enhance existing features or to modify features to resolve unwanted features interactions as will be discussed more fully below. The development module 24 may also be arranged to enable the features definition database 22 to be optimized using known database optimization techniques and tools to store the complete set of features definition in an efficient manner. A connection interface 26 between the development module 24 and the features definition database 22 comprises a database query language enabled interface. In one arrangement, this comprises a SQL data manipulation and definition language interface. However, in another arrangement, the interface is enabled to use standard web services protocols such as XQuery in a Service Oriented Architecture "SOA" as defined by the World Wide Web Consortium "W3C". Reference is made here to http://www.w3.org/ the contents of which are incorporated herein by way of reference. The interface 26 may comprise a database engine as will be familiar to those skilled in the art. The database engine may be embodied in the development module 24.

The development module 24 may comprise a tool having a graphic user interface "GUI" to enable a software developer to visually manipulate in a known manner data stored in the features definition database 22. There are a number of known GUI based tools that perform such functions that could be employed as the development module such as Microsoft's SQL Enterprise Manager for the Microsoft SQL Server 2005. The development module 24 may also be arranged in a known manner as an integrated development environment "IDE".

The software development and testing environment 10 includes a software optimization module 28 for generating an optimized embedded device database 30 comprising, in an optimized form, database encoded logic for controlling the operations of a data processing device 12. Coupled to the optimized embedded device database 30 is a runtime environment 32 such as a virtual machine "VM" embodied in the computing platform 20. The VM 32 may be a Java enabled VM. The VM 32 enables the operation of the features software encoded into the embedded device database 30 to be tested in the software development and testing environment 10.

Also provided in the software development and testing environment 10 are a database 34 comprising a copy of the optimized embedded device database 30 for replication to data processing devices 12, a database 36 of initial settings for the data processing devices 12 with default setting values for a new data processing device and a database 38 of stored settings for data processing devices 12 including a backup of device settings received from such devices after user customization.

Figure 3:
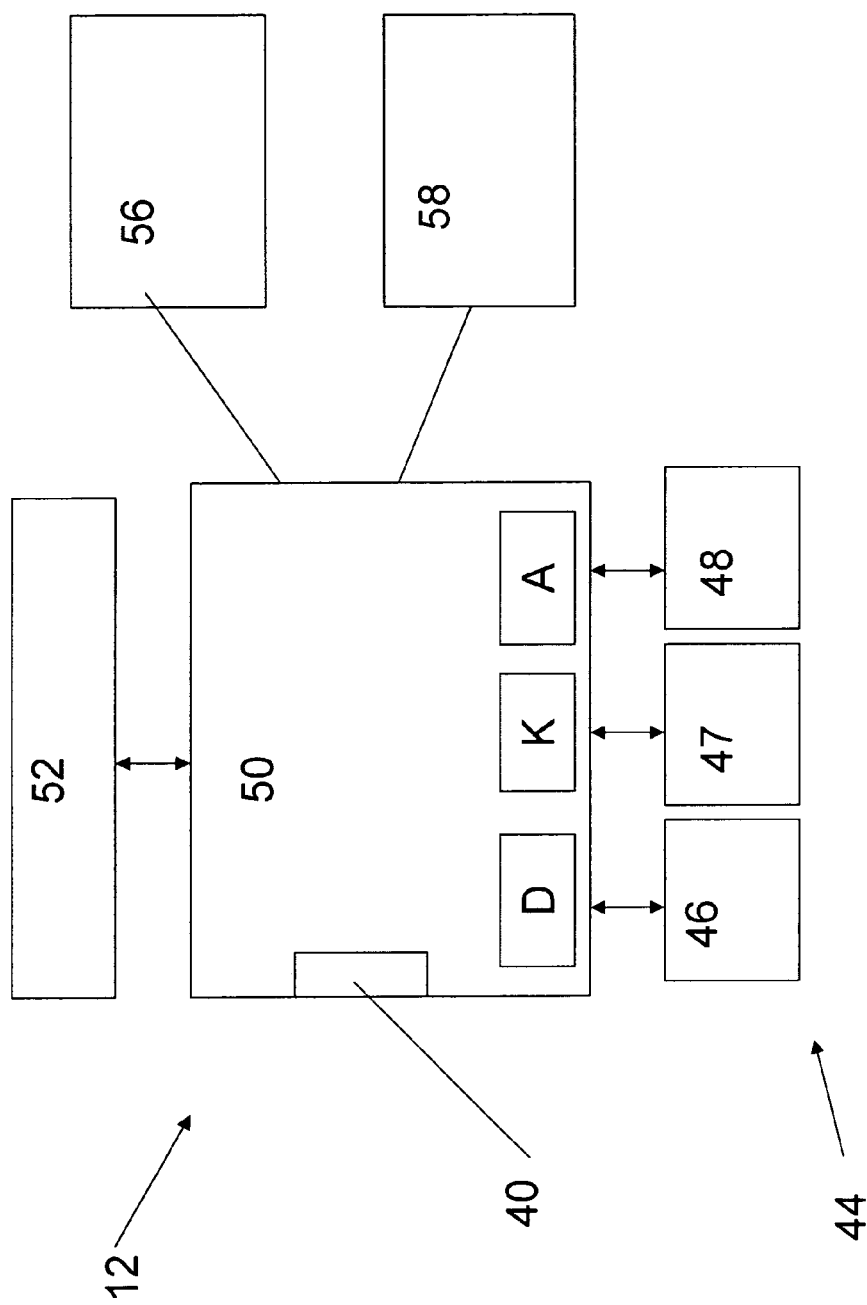
FIG. 3 is a schematic block diagram representative of a data processing device in accordance with the present invention.

Referring to FIG. 3, a data processing device 12 such as an Internet Protocol (IP) phone, for example, is connected to the software development and testing environment 10 by a database query language enabled interface 40. The data processing device 12 may be a Simple IP "SIP" phone although it should be understood that it could be any telecommunication device such as a PBX, a switch, a router or the like. It will also be understood that in other non-telecommunications fields, the data processing device 12 may be any intelligent device capable of implementing features software in a runtime environment. The interface 40 could comprise a fixed physical connection between the data processing device and development environment 10, but is preferably a network connection 18 (FIG. 1). Preferably, the data processing device 12 is located remotely from the development environment 10 and is connected thereto through a private network such as an enterprise network and/or a public network such as the Internet. The network connection 18 may include any known form of links including wireless links. The data processing device 12 may be one of a plurality of such devices connected to the development environment 10 to receive features software additions, enhancements and/or upgrades.

The data processing device 12 comprises, by way of example only, a number of operation modules 44 comprising a display 46, at least one input device such as a keyboard 47 or touch screen module and audio input and output means 48 such as a microphone and a speaker. It will be understood that the device 12 will comprise other known circuitry for implementing operations consistent with the nature of the device 12. For example, where the device 12 is a phone, it will include a telephony network connection and means for processing received signals and means for transmitting signals but such circuitry will be familiar to a skilled person and need not be described here. The operations modules 44 are controlled through execution of respective objects or records in tables stored in a device database 50 comprising database encoded feature logic. The device database 50 may comprise any form of non-volatile memory, such as a flash memory, a hard drive or a USB key. Alternatively, the device database 50 could comprise a network database such as a Sun Microsystems Network File System or a Structured Query Language "SQL" database such as an ODBC enabled database. The device database 50 is a copy by way of replication of the copy database 34 of the software development and testing environment 10. The database encoded feature logic comprises code snippets or software modules (hereinafter referred to as software modules) executable in a runtime environment 52 such as a virtual machine "VM" embodied in the device. The VM 52 may be a Java enabled VM. The VM 52 is coupled to the device database 50 by a database query language enabled interface 54. This may be a SQL enabled interface or an XQuery enabled interface. This may also comprise a database engine embodied in the device 12.

The data processing device 12 further comprises a database 56 of initial settings for the device 12 including default values for a new device. These can be employed by the user of the device to reset the device to a "factory default format". A database 58 of current attribute values is provided for enabling the VM 52 to execute the database encoded logic stored in the device features logic database 50. The database 58 of current attribute values could be enabled to include dynamic queries to other databases such as, for example, a "Message Waiting" query to a database that is controlling a voice mail system for the SIP phone (data processing device 12).

The feature definition database 22 of the software development and testing environment 10 can be structured in a way that maps directly to a formal language specification of the set of features supported by the data processing device 12. Formal languages such as the one provided in the examples below may be used to form the formal language specification for the features of the data processing device 12. In an exemplary formal language, a feature may comprise one or more scenarios, each scenario being defined by a number of specific attribute values or states (hereinafter referred to as values) and a specific event that can occur in association with said data processing device. Attribute values can describe the physical characteristics of the device such as, for example, "ButtonUp" or "ButtonDown" and can also describe abstract characteristics such as, for example, "idle" or "busy". Code is written for the "physical" attribute values to enable the feature to be implemented through execution of this code in the runtime environment 52, i.e. the virtual machine, of the data processing device 12.

The snippets of code or software modules for implementing a feature map to its "physical" attribute values. The software modules are pieces of code that are written once and thus can be considered as being generic code forming the building blocks of the features software. A new feature can be created by assembling in the formal language a specification comprising the list of attribute values, both physical and abstract, and the event that define said feature whereby the software modules that map to the physical attribute values of the newly created feature comprise the software to be executed in the runtime environment 52 for implementing said newly created feature. It will be appreciated therefore that, once the software modules are written, a features designer need not rewrite code to create new features but can work in the formal language using appropriate GUI development tools to do so.

Consider a simple feature for a phone such as "BasicCall" operation as an example of one preferred means of encoding software logic for the operation of this feature in the features definition database. A formal language can be used to describe the operation of this basic feature as shown in Table 1 attached hereto.

It can be seen from the example of the formal language for the feature "Basic Call" shown in Table 1 that it comprises four scenarios a) to d). Each scenario comprises a number of attributes having an initial value followed by an event, the event being followed by a list of attributes whose values are altered by the event. An attribute can hold an abstract value or a physical value dependent on the event. For example, in scenario 1), the attribute "CallState" has an initial value of "idle" which is an abstract value whereas, within said scenario following the event "PhoneOffhook", the value of said attribute "CallState" changes to "Dialling" which is a physical value. In other words, there is no code required to cause the "CallState" of the phone to be not dialling, i.e. idle, whereas code is required to cause the phone to dial an inputted number when the phone handset is off hook. It will be understood that the formal language example given above does not include the notators 1) to 4) which have been added to the example for ease of reference in this description.

The formal language can be represented by a natural language description that can be derived from this formal definition or vice versa. The natural language representation is an easily understandable form for a user that could be automatically generated from the database for documentation purposes, but is of little value in directly structuring the content of the features definition database 22. Documentation generated from the database 22 would have the benefit of being always accurate with respect to feature operation since it would reflect the exact logic used for feature execution. The natural language representation for the "BasicCall" feature is shown in Table 2 attached hereto.

In order to structure, i.e. encode, the content of the features definition database 22 in a manner that makes the features definitions susceptible to manipulation by database query languages such as SQL or XQuery, it is necessary to translate the formal language specification to a database encoding. Taking the example of the feature "BasicCall", a possible database encoding may be as demonstrated in Table 3 attached hereto.

It can be seen from the example provided by Table 3 that the formal language for scenario 1) is mapped to a database structure comprising a row (R0) and a plurality of columns (C0 to C12). It will be appreciated that the formal language could be translated to any suitable database object such as a table or a view. The translation step comprises identifying those attributes and the event that define the scenario. In this case, they comprise the attributes "CallState", "Speaker" and "Microphone" and the event "Offhook" (equivalent to "PhoneOffhook"). Each of the attributes is entered into the database structure both before and after the event in order that the database structure contains the values of the attributes as they were before the event occurs and how they have changed in response to occurrence of the event. The list of attribute names and the identity of the event are employed as titles for respective one of the columns C0 to C12. Each of the scenarios defining a feature is entered into a respective database structure, e.g. R0/C0-C12, R1/C0-C12, R2/C0-C12 or R3/C0-C12. The database structures may be consecutive structures although that need not be in the case.

With reference to scenario 1), it can be seen that in the database structure for this scenario comprising the column/row combination R0/C0-C12, the "CallState" attribute has an initial abstract value of "idle" and the attributes "Speaker" and "Microphone" each has an initial value set to any value representative of the fact that the speaker and microphone are silent for the "CallState"="idle". Thus, it can be seen that no code is necessary for these attributes prior to an "Offhook" event since the phone is not operable to dial a number nor are the microphone and speaker required to be operable. After the event "Offhook" has occurred, the values of some of the attributes defining scenario 1) of the feature "BasicCall" alter. It can be seen from the example that the attribute "CallState" takes a value represented by the semantic "Dialling", the attribute "Speaker" takes a value of "Dialtone" whereas the attribute "Microphone" remains unchanged (N/C). In other words, the offhook event results in the execution of code to ready the phone for dialling a user inputted phone number and, in order that a user is aware of the readiness state of the phone, the speaker is controlled to emit a dial tone. Thus, it can be seen that the event offhook causes two of the three attributes that define it to take physical attribute values with a remaining one being unchanged holding any value. The values of attributes can be entered into the database structures through, for example, binary encoding or in an Extensible Markup Language "XML" format of said values.

In the example of the "BasicCall" feature, it can be observed that the four scenarios are consecutive. As such, the states (values) of the attributes of a scenario following the occurrence of its event comprises the initial states of the attributes for the following scenario. Thus, the latter part (right hand part as it is represented in the example being described with reference to Table 3) of a database structure for a preceding scenario may generally comprise the first part of a database structure for a succeeding scenario. It will be appreciated that this gives rise to some optimization by using the later part of the database structure of a preceding scenario to comprise the first part of the database structure for a succeeding scenario.

The notators C0 to C12 and R0 to R3 do not form part of the database encoding of the formal language specification for the "BasicCall" feature but are representative of the column (C) and row (R) structure that might be used to create a database object or record for such feature. What is important is that the formal language is translated into a form, i.e. a database structure, that can be easily loaded into the database and in a form that can be manipulated using a database query language. The database is also arranged to contain in the form of tables or the like the software modules for respective physical attributes that can be called as required by the virtual machine when implementing a feature in the runtime environment. The software modules comprise the logic, i.e. code, which determines the operation and transformation of attribute values that should occur for any given event scenario.

Thus, it can be seen from the foregoing that all features definitions of features supported by a data processing device 12 such as a phone can be encoded into respective database structures that enable said feature definitions to be manipulated using existing database data manipulation tools through the use of a database query language such as SQL or XQuery.

By providing a features definition database encoded with all of the features supported by a data processing device 12 such as a phone, the present invention provides a convenient way of providing such a device 12 with a complete set of feature definitions necessary for the operation of the device 12. This is achieved through using the database query language feature often referred to as "replication" by which the device database 50 is arranged to replicate or synchronize its contents with the features definition database 22 or, more particularly, with the copy database 34 holding a copy of the optimized database encoded control logic for the device 12. Other commands such as "compare" and "comparison and synchronize" that cause replication and/or synchronization of the contents of the two databases may also be used. The replication command could be initiated by any of the features definition database 22, the copy database 34, the device 12 itself or an intermediary server 19 (FIG. 1) located in-line between the software development and testing environment 10 and the device 12. The server 19 may form part of a distributed network whereby the server 19 and similar other such servers synchronize the contents of their respective databases with that of the features definition database 22 or copy database 34 before then synchronizing their newly synchronized contents with one or more device databases 50 of the data processing devices 12 that they serve. This arrangement provides an efficient method by which an enterprise can "install" a command "program" for new devices or provide features software additions, upgrades and/or enhancements to existing devices in their networks.

In a preferred arrangement, the device database 50 of the phone (data processing device) 12 comprises a lightweight database. The lightweight database may comprise a Mini-SQL" Version 2.0 "mSQL" database that is arranged to provide fast access to stored control logic requiring low memory using a subset of SQL query commands as its query interface. Mini SQL Version 2.0 is the second generation of the Mini SQL product mSQL Version 1.0 which has been available in the public domain for many years. The database query language enabled interface between the phone and the features definition database or in-line server may comprise s mSQL database engine. Use of a lightweight database in a data processing device to store in a database structured manner control logic for the device is advantageous in that low memory capacity devices can be employed to embody the lightweight database. To enable the phone to operate using a device database 50 for storing its control program in the form of a lightweight database, the features definition database 22 is arranged to generate an optimized form of the database encoded features definitions for the phone 12. This is formed using existing optimization techniques provided by the development module 24.

Since feature definitions for the data processing device 12 reside off-board in the features definition database 22 of the software development and testing environment 10, the testing and development tools provided by the development module 24 inherit the utility of the database query language, e.g. SQL or XQuery, and the efficiency of modern relational database technology to perform analysis and update of said features definitions.

The optimized form of the database encoded feature definitions prepared by the features definition database 22 for a data processing device 12 may be arranged to include, in addition to a basic set of features, only the additional features that a user of the device 12 has subscribed to. This may be determined by the features definition database 22 by reference to a table identifying subscribers and the features they have subscribed to. Thus, the generated database encoded logic for the database 50 of a device 12 such as a phone may be optimized further by containing the database encoded logic for only basic features and subscribed to features for the user of the device 12. Alternatively, on initiating a replication process to synchronize the contents of relative entries of the features definition database 22 or copy database 34 with the device database 50 of a user device 12, the features definition database 22 may interrogate the user device 12 to determine what subscription based features it subscribes to. In a further arrangement, where the user device 12 initiates the synchronization process, it is arranged to provide to the software development and testing environment 10 data indicative of the subscription based features it subscribes to.

The replication or synchronization commands are not only used for first time population of database encoded logic from the features definition database 22 or copy database 34 to the control logic database 50 of a user device 12 but are equally useful in providing upgraded, enhanced or new features for the user device.

An example of how a database encoded feature can be enhanced is provided by the following example of a toll restrictions enhancement of the "BasicCall" feature, i.e. the basic call operation of the device is adapted to block certain toll numbers being dialled. As shown in Table 4 attached hereto, the formal language specification for "BasicCall" is modified to include a toll restriction scenario. The feature can be modified by a designer using a GUI based database manipulation tool as aforesaid working in the formal language specification. The modified feature in formal language format is shown in Table 4. This can be translated to a database encoding as shown in Table 5:

As an another example of feature enhancement, Table 6 comprises the modified formal language specification for a message waiting tone. This can be translated to a database encoding as shown in Table 7.

The foregoing examples demonstrate the ease with which it is possible to manipulate the database encoded logic for features to modify existing features to provide enhanced features. It will be understood that a new feature may be created in a similar manner through the use of a GUI based tool to drag and drop attributes and events to define new features.

As has already been described, the development module 24 may comprise a known database manipulation tool such as Microsoft's Enterprise Manager for the Microsoft SQL Server 2005. The development module 24 allows designers to perform queries in the database query language such as SQL or XQuery to understand the feature definition of any specified scenario or group of scenarios. The development module is adapted to allow designers to specify new feature definitions and to walk through potential event scenario sequences to emulate feature operation to diagnose feature related problems such as features interactions. This does not require the examination and/or modification of source code as encountered in known debugging techniques. The development module 24 allows designers to perform queries in the database query language to determine what the software code will do for any combination of attribute values by way of testing specified features and scenarios.

For example, a feature designer could determine all of the unique feature operations of the Toll Call Restrictions feature with a query such as:

SELECT*
FROM Scenario DB
WHERE PhoneRestrictions='TollRestricted'

Any combination of feature attribute options and call handling scenarios can be determined by forming a query that includes all of the attributes that are interesting to the designer. This also enables the designer to quickly identify features that respond to the same event or sequence of events and thus identify those that may interact in an unhelpful manner. All of the capabilities of modern database technologies, such as reporting tools and visual database management tools, can be used to improve the efficiency of the design debugging process. In addition, visual tools can be implemented for specific applications that further enhance the capabilities of the integrated design environment.

The present invention is applicable to software development and testing in other fields of endeavor in addition to the field of telecommunications.

TABLE 1

Formal Language:

1) where { queryAttribute ("CallState", "Idle")
    and event ("PhoneOffhook")
    then { setAttribute ("CallState", "Dialling"),
        setAttribute ("Speaker", "DialTone")}
2) where { queryAttribute ("CallState", "Dialling"),
    and event ("PhoneDials TollNumber")
    then { setAttribute ("CallState", "Ringback"),
        setAttribute ("Speaker", "Ringback Tone")}
3) where { queryAttribute ("CallState", "Ringback"),
    and event ("PhoneAnswered")
    then { setAttribute ("CallState", "Connected"),
        setAttribute ("Speaker", "IncomingStream"),
        setAttribute ("Microphone", "OutgoingStream")}
4) where { queryAttribute ("CallState", "*"),
    and event ("PhoneOnhook")
    then { setAttribute ("CallState", "Idle"),
        setAttribute ("Speaker", "Silence"),
        setAttribute ("Microphone", "Silence")}

Table 2—Natural Language:

When a phone is idle and goes off-hook, dial tone will be played from its speaker and the phone will be considered to be in the dialling state. If the user dials a toll phone number while in the dialling state, the phone will enter a ringing state and the user will hear ring-back tone from its speaker. After the call is answered it will enter a connected state and the media stream will flow to the speaker and from the microphone of the phone. Placing the phone on-hook at any time will cause the phone to become idle and stop all transmissions.

TABLE 3

Database Encoding of "BasicCall" feature:

| C0 Scenario | C1 CallState | C2 Speaker | C3 Microphone | C4 | C5 | C6 Event | C7 CallState | C8 Speaker | C9 Microphone | C10 | C11 | C12 |
|---|---|---|---|---|---|---|---|---|---|---|---|---|
| R0 1 | Idle | * | * | | | Offhook | Dialling | Dialtone | N/C | | | |
| R1 2 | Dialling | * | * | | | TollNumber | Ringback | RBTone | N/C | | | |
| R2 3 | Ringback | * | * | | | Answer | Connected | Incoming | Outgoing | | | |
| R3 4 | * | * | * | | | Onhook | Idle | Silence | Silence | | | |

N/C = No Change,
"*" = Any Value

TABLE 4

Formal Language for Toll Call Restrictions Enhancement:

where { queryAttribute ("CallState", "Idle"),
and event ("PhoneOffhook")
then { setAttribute ("CallState", "Dialling"),
    setAttribute ("Speaker", "DialTone")}
where { queryAttribute ("CallState", "Dialling"),
    queryAttribute ("PhoneRestrictions", "Unrestricted")}
and event ("DialTollNumber")
then { setAttribute ("CallState", "Ringing"),

TABLE 4-continued

Formal Language for Toll Call Restrictions Enhancement:

```
                setAttribute ("Speaker", "Ringback Tone")}
where {   queryAttribute ("CallState", "Dialling"),
          queryAttribute ("Phone Restrictions", "TollRestricted")}
and   event ("DialTollNumber")
then  {   setAttribute ("CallState", "HaltRestricted"),
          setAttribute ("Speaker", "Restriction Tone")}
where {   queryAttribute ("CallState", "Ringing"),
and   event ("Answered")
then  {   setAttribute ("CallState", "Connected"),
          setAttribute ("Speaker", "IncomingStream"),
          setAttribute ("Microphone", "OutgoingStream")}
where {   queryAttribute ("CallState", "*"),
and   event ("ntOnhook")
then  {   setAttribute ("CallState", "Idle"),
          setAttribute ("Speaker", "Silence"),
          setAttribute ("Microphone", "Silence")}
```

TABLE 6-continued

Formal Language for - Message Waiting Tone:

```
where {   queryAttribute ("CallState", "Dialling"),
          queryAttribute ("PhoneRestrictions", "Unrestricted")}
and   event ("DialTollNumber")
then  {   setAttribute ("CallState", "Ringing"),
          setAttribute ("Speaker", "RingbackTone")}
where {   queryAttribute ("CallState", "Dialling"),
          queryAttribute ("PhoneRestrictions", "TollRestricted")}
and   event ("DialTollNumber")
then  {   setAttribute ("CallState", "HaltRestricted"),
          setAttribute ("Speaker", "RestrictionTone")}
where {   queryAttribute ("CallState", "Ringing"),
and   event (Answered")
then  {   setAttribute ("CallState", "Connected"),
          setAttribute ("Speaker", "IncomingStream"),
          setAttribute ("Microphone", "OutgoingStream")}
where {   queryAttribute ("CallState", "*"),
and   event ("Onhook")
```

TABLE 5

Database Encoding for Toll Call Restrictions Enhancement:

| | C0 Scen | C1 CallState | C2 Speaker | C3 Mic. | C4 Phone Restr. | C5 | C6 Event | C7 CallState | C8 Speaker | C9 Mic. | C10 Phone Restr. | C11 | C12 |
|---|---|---|---|---|---|---|---|---|---|---|---|---|---|
| R0 | 1 | Idle | * | * | * | | Offhook | Dialling | Dialtone | N/C | N/C | | |
| R1 | 2 | Dialling | * | * | Unrestr. | | TollNum. | Ringback | RBTone | N/C | N/C | | |
| R2 | 3 | Ringback | * | * | * | | Answer | Connected | Incoming | Outgoing | N/C | | |
| R4 | 4 | * | * | * | * | | Onhook | Idle | Silence | Silence | N/C | | |
| R5 | 5 | Dialling | * | * | Restr. | | TollNum. | HaltRestr. | Restr. Tone | N/C | N/C | | |

TABLE 6

Formal Language for - Message Waiting Tone:

```
where {   queryAttribute ("CallState", "Idle"),
          queryAttribute ("PhoneMessageWaiting", "NoMessages"),
and   event ("PhoneOffhook")
then  {   setAttribute ("CallState", "Dialling"),
          setAttribute ("Speaker", "DialTone")}
where {   queryAttribute ("CallState", "Idle"),
          queryAttribute ("PhoneMessageWaiting", "Messages"),
```

TABLE 6-continued

Formal Language for - Message Waiting Tone:

```
then  {   setAttribute ("CallState", "Idle"),
          setAttribute ("Speaker", "Silence"),
          setAttribute ("Microphone", "Silence")}
```

TABLE 7

Database Encoding for Message Waiting Tone:

| | C0 Scen | C1 CallState | C2 Speaker | C3 Mic. | C4 Phone Restr. | C5 Mess. Wait. | C6 Event | C7 New CallState | C8 New Speaker | C9 New Mic. | C10 New Phone Restr. | C11 New Mess. Wait. |
|---|---|---|---|---|---|---|---|---|---|---|---|---|
| R0 | 1 | Idle | * | * | * | NoMess. | Offhook | Dialling | Dialtone | N/C | N/C | N/C |
| R1 | 2 | Dialling | * | * | Unrestr. | | TollNum. | Ringback | RBTone | N/C | N/C | N/C |
| R2 | 3 | Ringback | * | * | * | | Answer | Connected | Incoming | Outgoing | N/C | N/C |
| R4 | 4 | * | * | * | * | | Onhook | Idle | Silence | Silence | N/C | N/C |
| R5 | 5 | Dialling | * | * | Restr. | | TollNum. | HaltRestr. | Restr. Tone | N/C | N/C | N/C |
| R6 | 6 | Idle | * | * | * | Mess. | Offhook | Dialling | Spec. Dialtone | N/C | N/C | N/C |

TABLE 6-continued

Formal Language for - Message Waiting Tone:

```
and   event ("PhoneOffhook")
then  {   setAttribute ("CallState", "Dialling"),
          setAttribute ("Speaker", "SpecialDialTone")}
```

The invention claimed is:

1. A method of storing software for controlling operation of a data processing device, the method comprising:

translating a formal language specification representative of source code for the software into data suitable for storing in database structures and in a form suitable for being queried by a database query language;

storing said data in database structures of a database; and generating a database optimized form of at least one of said database structures, said optimized form comprising database encoded control logic for storing in the database.

2. The method of claim 1, wherein the software comprises features software and the formal language specification defines a feature as comprising a number of scenarios, each scenario comprising a number of attribute values or states and an event value.

3. The method of claim 2, wherein translating said formal language specification into database structures comprises for each scenario of a feature:

identifying the attributes and the event that define said scenario of said feature;

identifying the values or states of the attributes for prior to the event and the values or states of the attributes for after the event; and placing the values or states of the attributes for both prior to and after the event in a database structure.

4. The method of claim 3, wherein the values or states of the attributes for both prior to and after the event are placed in one of a row/column database structure, a column/row database structure, a database table, a database object and a database view.

5. The method of claim 4, wherein the values or states of the attributes for prior to the event are placed in a first part of the database structure and the values or states of the attributes for after the event are stored in a second part of the database structure.

6. The method of claim 5, wherein the value or state of the event is placed in a third part of the database structure located between the first and second parts of said structure.

7. The method of claim 2, wherein the values or states of the attribute values are one of binary encoded for placement in said database structure and transformed to Extensible Markup Language "XML" format for placing in said database structure.

8. The method of claim 5, wherein the second part of the database structure for a preceding scenario is used as the first part of the database structure for a succeeding scenario.

9. The method of claim 1, further comprising storing software code associated with said formal language specification in tables of said database in association with respective ones of said database structures.

10. A database comprising:

a plurality of database structures, each database structure being encoded with data derived from a respective part of a formal language specification and in a form suitable for being queried by a database query language, said formal language specification being representative of source code for software for controlling operation of a data processing device; and a database optimized form of at least one of the database structures, said optimized form comprising database encoded control logic for storing in the database.

11. The database of claim 10, wherein each part of the formal language specification comprises a scenario as defined by the formal language specification, where a number of scenarios comprise a software feature.

12. The database of claim 11, wherein each scenario comprises a number of attribute values or states and an event value.

13. The database of claim 12, wherein the database is arranged such that the values or states of the attributes for both prior to and after the event are placed in one of a row/column database structure, a column/row database structure, a database table, a database object and a database view.

14. The database of claim 11, wherein the database is arranged such that the values or states of the attributes for prior to the event are placed in a first part of the database structure and the values or states of the attributes for after the event are stored in a second part of the database structure.

15. The database of claim 14, wherein the database is arranged such that the value or state of the event is placed in a third part of the database structure located between the first and second parts of said structure.

16. The database of claim 12, wherein the database is arranged such that the values or states of the attribute values are one of binary encoded for placement in said database structure and transformed to Extensible Markup Language "XML" format for placing in said database structure.

17. The database of claim 14, wherein the database is arranged such that the second part of the database structure for a preceding scenario is used as the first part of the database structure for a succeeding scenario.

18. The database of claim 10, wherein the database is any of a non-volatile memory device, a hard drive, a Universal Serial Bus "USB" key, a network type database, a Structured Query Language "SQL" database, an Open DataBase Connectivity "ODBC" enabled database and a light weight database.

19. The database of claim 10, wherein the database is arranged such that software code associated with said formal language specification is stored in tables of said database in association with respective ones of said database structures.

20. A system for generating software for controlling operation of a data processing device, the system comprising:

a features definition database storing in database encoded form a formal language specification representative of source code for the software, said formal language specification being translated into a format suitable for storing in database structures and in a form suitable for being queried by a database query language;

a software development module coupled to said database for enabling a user to manipulate data stored in said database structures through the use of queries constructed in said database query language; and a software optimization module arranged to generate a database optimized form of the features definition database, said optimized form of the features definition database comprising database encoded control logic for storing in a database of a data processing device.

21. The system of claim 20, wherein the software development module is enabled to use a database query language comprising one of Structured Query Language "SQL" and XQuery.

22. The system of claim 20, wherein the system is arranged to any of install device control software, upgrade device control software and upgrade a feature of device control software by one of replicating and synchronizing the contents of the optimized form of the features definition database with the contents of the data processing device database.

23. The system of claim 22, wherein a server is provided in line in a connection between the system and the data processing device, whereby the server is arranged to control the data replication/synchronization process.

24. A method of installing software for controlling operation of a data processing device, the method comprising:

providing a features definition database storing in database encoded form a formal language specification representative of source code for the software, said formal language specification being translated into a format suitable for storing in database structures and in a form suitable for being queried by a database query language; and replicating the contents of said features definition database in a control program database of the data processing device;

prior to said replicating, generating a database optimized form of the features definition database, said optimized form of the database comprising database encoded control logic for storing in a database of a data processing device.

25. A method of updating software for controlling operation of a data processing device, the method comprising:

providing a database storing in database encoded form a formal language specification representative of source code for the software, said formal language specification being translated into a format suitable for storing in database structures and in a form suitable for being queried by a database query language;

generating a database optimized form of the database, said optimized form of the database comprising database encoded control logic; and synchronizing the contents of said database with a database encoded control program stored in the optimized form of the database.

* * * * *